UNITED STATES PATENT OFFICE.

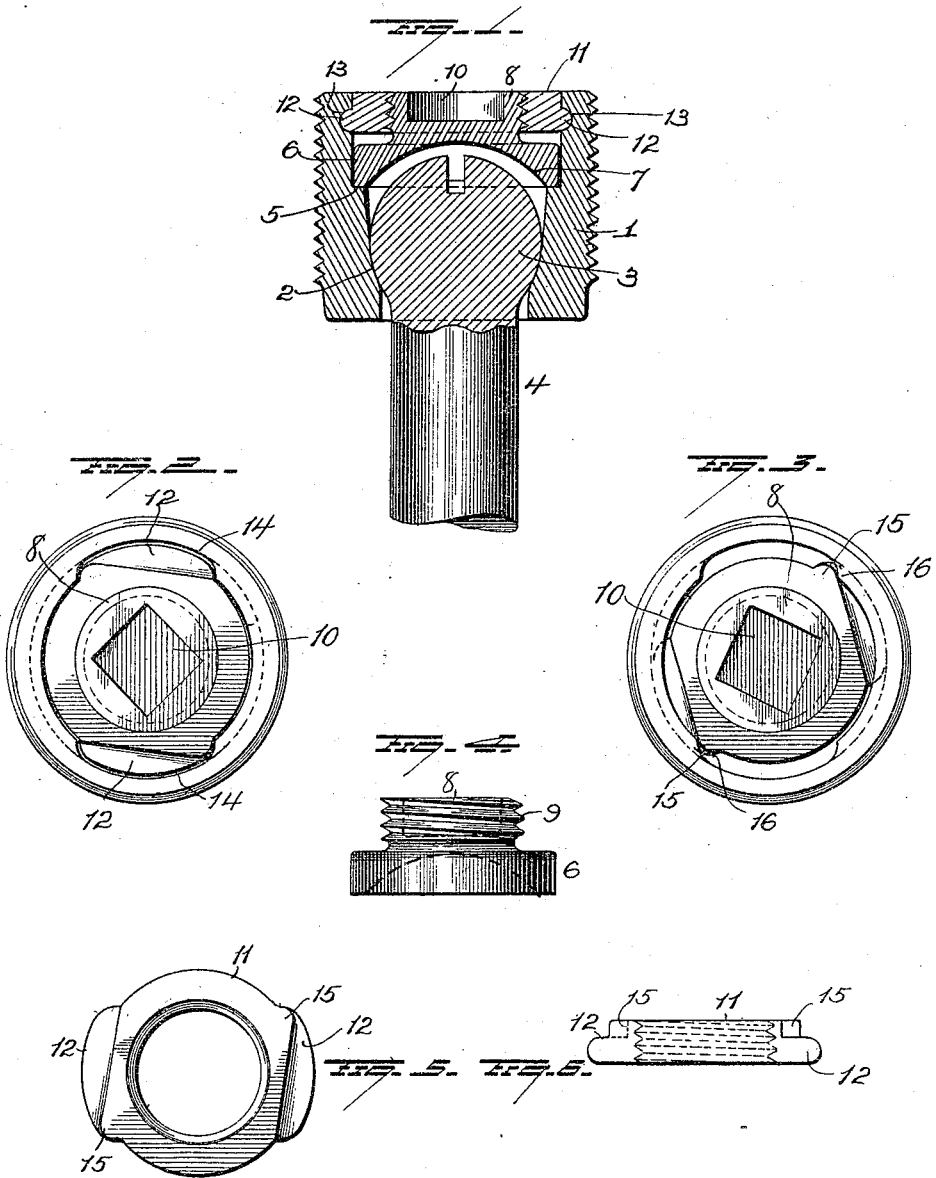

ETHAN I. DODDS, OF PITTSBURGH, PENNSYLVANIA, ASSIGNOR TO FLANNERY BOLT COMPANY, OF PITTSBURGH, PENNSYLVANIA.

STAY-BOLT STRUCTURE.

1,295,864.   Specification of Letters Patent.   Patented Mar. 4, 1919.

Application filed April 26, 1918. Serial No. 230,900.

*To all whom it may concern:*

Be it known that I, ETHAN I. DODDS, a citizen of the United States, and a resident of Pittsburgh, in the county of Allegheny and State of Pennsylvania, have invented certain new and useful Improvements in Stay-Bolt Structures; and I do hereby declare the following to be a full, clear, and exact description of the invention, such as will enable others skilled in the art to which it appertains to make and use the same.

This invention relates to improvements in staybolt structure for boilers and more particularly to the cap or closure construction for the bearing sleeve,—the object of my present invention being to provide simple and efficient means whereby the cap or closure may be quickly removed to permit access to the bolt for testing the same, the construction being such that the cap may be quickly replaced and securely locked in its normal position.

With this and other objects in view, the invention consists in certain novel features of construction and combinations of parts as hereinafter set forth and pointed out in the claims.

In the accompanying drawings; Figure 1 is a sectional view of a staybolt structure showing an embodiment of my invention; Fig. 2 is a plan view showing the closure unlocked; Fig. 3 is a similar view showing the closure locked; Fig. 4 is a separate view of the cap or closure; Figs. 5 and 6 are separate views of the locking member.

1 represents a bearing sleeve which may be threaded exteriorly to screw through a hole in the boiler sheet and made internally with a curved bearing 2 for the curved or spherical head 3 or a staybolt 4.

Beyond the bearing for the bolt head, the bore of the bearing sleeve is enlarged somewhat and provides an annular shoulder 5 which affords a seat for a cap or closure 6 which fits neatly within the enlarged bore of the sleeve. The cap or closure 6 is made with a curved or partly spherical under face as indicated at 7 to provide necessary clearance for the bolt head and said cap is provided with a shank 8 having exterior left-hand screw threads 9 and an angular socket 10 to receive a wrench.

The shank 8 receives an internally threaded collar or locking member 11 which enters the outer end of the bearing sleeve and is provided with lugs 12 to enter grooves 13 in the inner wall of the bearing sleeve. The outer end of the bearing sleeve is made with recesses 14 to permit the passage of the lugs 12 when the cap and locking ring or member are being inserted into or removed from the locking sleeve. The locking member is also provided, (at one end of each lug 12) with shoulders which form stops 15 to engage the shoulders 16 formed by one end wall of each recess 14.

In assembling the parts, the cap with the locking member thereon, will be inserted into the outer end of the sleeve, and when the cap and locking member is turned, the lugs 12 will move through the grooves 13 until the stops 15 on said locking member engage the stops or shoulders 16 on the sleeve. Continued turning force applied to the cap will now cause the latter to be pressed tightly against its seat 5 within the bearing sleeve. By a reversal of the operation above described, the cap and locking member may be quickly removed from the bearing to expose the head of the bolt and permit said bolt to be tested.

Having fully described my invention what I claim as new and desire to secure by Letters-Patent, is:—

1. In a staybolt structure, the combination with a bearing sleeve having a cap seat therein, of a removable cap disposed within said bearing sleeve, and a locking member connected with said cap and adapted to engage the sleeve to lock the cap in place and permit its quick removal.

2. In a staybolt structure, the combination with a bearing sleeve having a cap seat therein, of a cap to rest on said seat within the bearing sleeve, said cap having a threaded shank, and a locking member threaded on said shank and adapted to engage the sleeve.

3. In a staybolt structure, the combination with a bearing sleeve having a cap seat therein and having interior grooves, of a cap to enter the sleeve and rest on said cap seat, said cap having a threaded shank adapted to receive a wrench, and a locking member threaded on said shank, said locking member having lugs to enter the grooves in the bearing sleeve and also having a stop to engage the sleeve.

4. In a staybolt structure, the combination with a bearing sleeve having a cap seat therein, said sleeve having internal grooves and recesses communicating with said grooves, of a cap to enter the sleeve and rest on said cap seat, said cap having a threaded shank adapted to receive a wrench, a locking member threaded on said shanks and having lugs to enter said grooves, and said locking member having shoulders forming stops to engage end walls of the recesses in said bearing sleeve.

In testimony whereof, I have signed this specification in the presence of two subscribing witnesses.

ETHAN I. DODDS.

Witnesses:
S. G. NOTTINGHAM,
R. S. FERGUSON.